United States Patent [19]
Williams

[11] Patent Number: 5,569,374
[45] Date of Patent: Oct. 29, 1996

[54] PORTABLE DRINKING WATER FILTRATION APPARATUS

[76] Inventor: Richard T. Williams, P.O. Box 39, Uwchland, Chester County, Pa. 19480

[21] Appl. No.: 184,299

[22] Filed: Jan. 21, 1994

[51] Int. Cl.⁶ .................................................. B01D 35/26
[52] U.S. Cl. .................... 210/136; 210/240; 210/258; 210/416.3; 210/470; 210/472
[58] Field of Search ........................ 210/136, 238, 210/240, 282, 416.3, 422, 423, 458, 470, 472, 474, 258, 262

[56] References Cited

U.S. PATENT DOCUMENTS

| | | | |
|---|---|---|---|
| 753,780 | 3/1904 | Woods | 210/416.3 |
| 4,715,271 | 12/1987 | Kitagawa | 210/474 |
| 5,120,437 | 1/1994 | Williams | 210/244 |

OTHER PUBLICATIONS

General Ecology, Inc.'s Brochure, "First Need®—Portable Drinking Water Systems".
Katadyn's Brochure, "Advanced Swiss Ceramic Water Filtration Technology".
PUR's Information Sheet, "PUR Water Purifiers", 1992.
MSR's Information Sheet, "WaterWorks™ Total Filtration System".

*Primary Examiner*—Ivars Cintins
*Attorney, Agent, or Firm*—John F. A. Earley; John F. A. Earley, III

[57] ABSTRACT

A portable drinking water filtration apparatus for filtering and purifying water comprises a housing, a chamber formed inside the housing having an inlet opening, a first outlet opening, and a second outlet opening, filtration media positioned inside the chamber between the chamber inlet opening and the chamber outlet openings, and a pump mounted on the housing for forcing water through the filtration media, the second chamber outlet opening being in contact with the first chamber outlet opening for venting air as water is forced through the filtration media and discharged from the first chamber outlet opening and for discharging water from the chamber when the first chamber outlet opening is plugged. A plurality of bottle connection members are formed on the housing adjacent to the first chamber outlet opening for connecting the housing to a variety of different sized bottles.

28 Claims, 12 Drawing Sheets

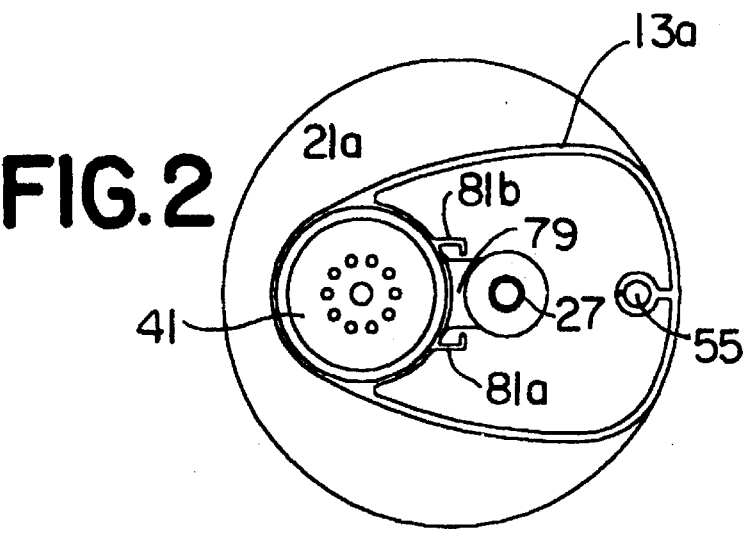
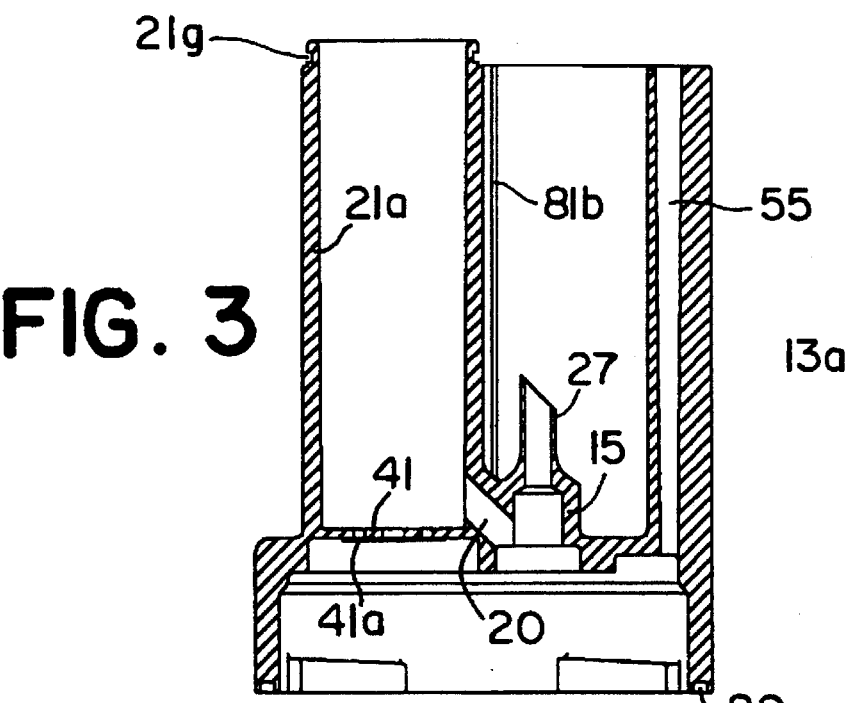
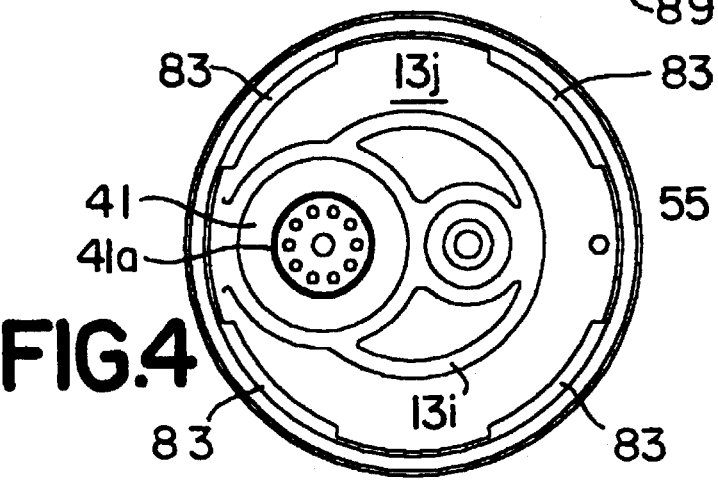

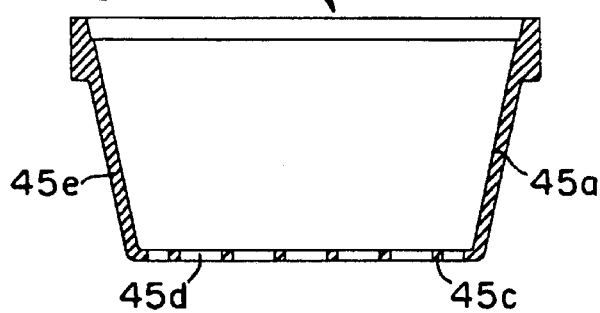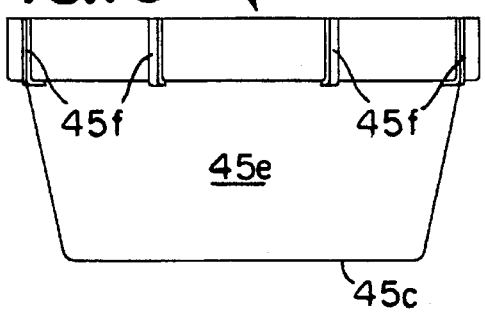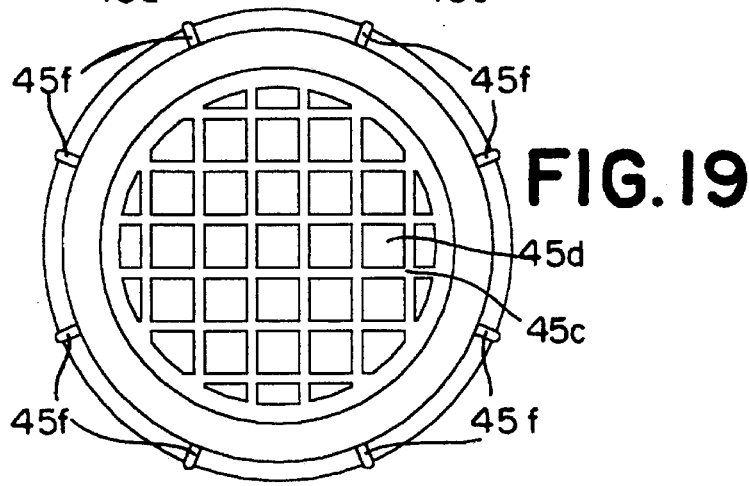

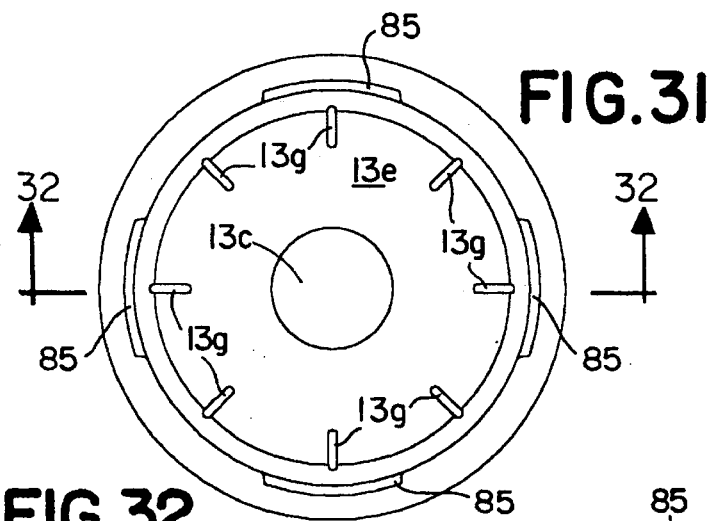
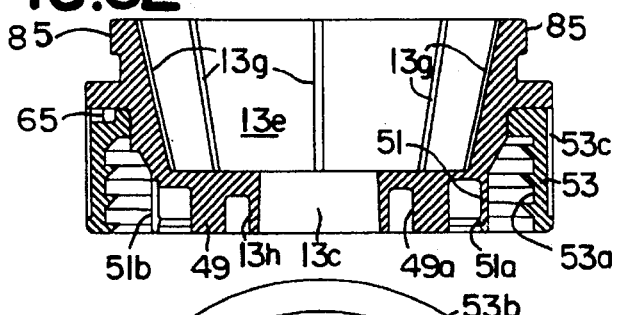
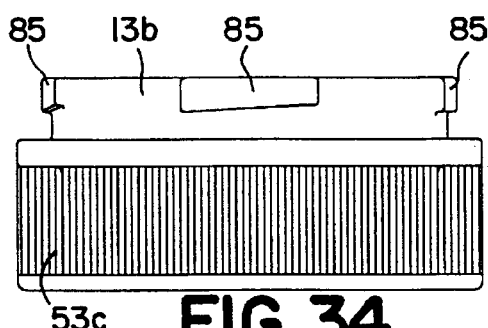
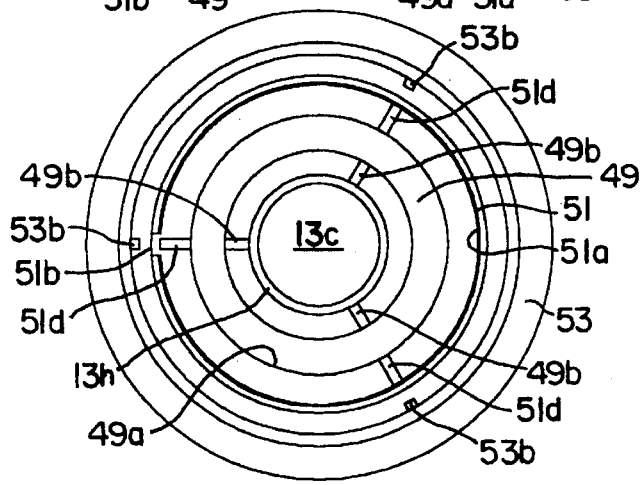

PORTABLE DRINKING WATER FILTRATION APPARATUS

BACKGROUND OF THE INVENTION

FIELD OF THE INVENTION

This invention relates to filtration and purification of water, and more particularly concerns a portable water filtration apparatus for filtering and purifying water obtained from any non-salt water source, such as, for example, from a stream by a camper on a camping trip, or, for example, from a water faucet connected to an unpurified water source in an undeveloped area.

SUMMARY OF THE INVENTION

It is an object of the invention to provide a portable drinking water filtration apparatus that is small enough to be carried in a backpack, a belt pack, a suitcase, a briefcase, and the like.

Another object of the invention is to provide such a portable drinking water filtration apparatus that removes giardia, amoebae, and larger pathogens, toxic chemicals, foul tastes and odors, dirt and sediment, and radioactive particles, and kills or destroys waterborne disease causing bacteria and viruses when used with a biocide.

Another object of the invention is to provide such a portable drinking water filtration apparatus that includes a self-contained pump and a replaceable media element canister.

Another object of the invention is to provide a portable drinking water filtration apparatus that is affordable, is easy to use, and is light-weight and compact.

Still another object of the invention is to provide a portable drinking water filtration apparatus that is capable of providing a substantial amount of purified water, for example, about 1 or 2 cups of microfiltered water per minute.

Still another object of the invention is to provide a portable drinking water filtration apparatus that is versatile enough that is can be used by different outdoor recreation groups, such as bikers, mountain climbers and backpackers, as well as by business travelers and vacationers.

Still another object of the invention is to provide a portable drinking water filtration apparatus that is self-contained so that it does not require special storage in a plastic container, like a plastic bag or carrying bag.

Another object of the invention is to provide a portable drinking water filtration apparatus having an optional cartridge connected thereto for pre-filtering and/or for biocidal treating unpurified water.

These and other objects are accomplished by providing a portable drinking water filtration apparatus for filtering and purifying water which comprises a housing having a cylinder-like wall and a bottom cap attached to a lower end portion of the wall to form a container. A pump block is formed inside the housing and has a water inlet port, a water outlet port, and a passageway extending through it between the inlet port and the outlet port. A pump is provided in the pump block for pumping water through the pump block and into a filtration chamber containing a filtration canister for purifying the water. After passing through the filtration canister, the water is pumped out a first water outlet opening that extends to an outlet port in the bottom cap of the housing.

The bottom cap of the housing is provided with three connection members for connecting the bottom cap of the housing to the mouths of three different sizes of standard containers (e.q., a standard soda bottle, a standard bike bottle, and a standard wide mouth trail bottle such as that as made by Nalgene), so that the purified water leaving the portable drinking water filtration apparatus through the outlet port in the bottom cap of the housing enters directly into a bottle mounted on one of the connection members.

Because the invention includes a connection member for connecting the invention to standard plastic soda bottles, such as one-liter Pepsi bottles, such plastic bottles may be reused as water bottles over and over again rather than being thrown out after the soda is gone, thereby conserving materials and providing a convenient, low cost water container.

The filtration canisters of the invention are replaceable so that if someone happens to run into some very foul water and clogs the canister/matrix the clogged filtration canister may be disposed of and quickly replaced with a new canister at a low cost.

A worn-out filtration canister is combustible, non-toxic, and suitable for use as fuel for campfires. Accordingly, used filtration canisters may be burned in a camp fire rather than being discarded as litter.

The portable drinking water filtration apparatus is also provided with a cover that may be mounted on the bottom cap of the housing for plugging the outlet port formed in the bottom cap of the housing and for protecting the three connection members formed in the bottom cap of the housing from dirt.

When the cover plugs the water outlet port formed in the bottom cap of the housing, the water being pumped through the portable drinking water filtration apparatus is pumped out from the filtration chamber through a channel that acts as a air vent when the outlet port of the bottom cap of the housing is being used, and through a spout mounted at the end of the channel into a container such as a glass.

Since the water filtration apparatus is small and portable, it may be used by campers to purify water obtained from streams and rivers, and it may be stored in the camper's backpack when not in use. Further, a traveler may carry the portable drinking water filtration apparatus in a suitcase, a briefcase, and the like when traveling to places where local tap water is not purified. The local unpurified water may be purified quickly with the water filtration apparatus of the invention.

BRIEF DESCRIPTION OF THE DRAWINGS

FIG. 2 is a view in top plan of the top portion of the housing;

FIG. 3 is a view in cross section of the top portion of the housing;

FIG. 4 is a view in bottom plan of the top portion of the housing;

3

Figure 7:
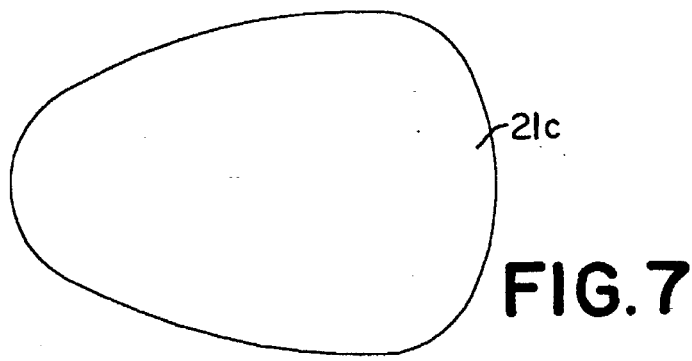
Figure 8:
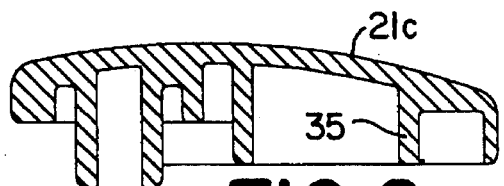
Figure 10:
Figure 9:
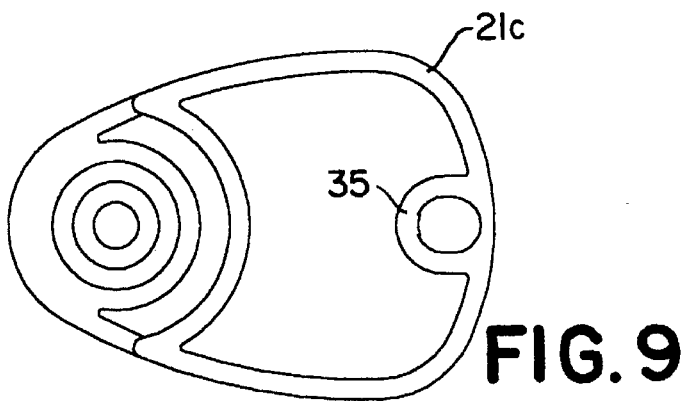
Figure 11:
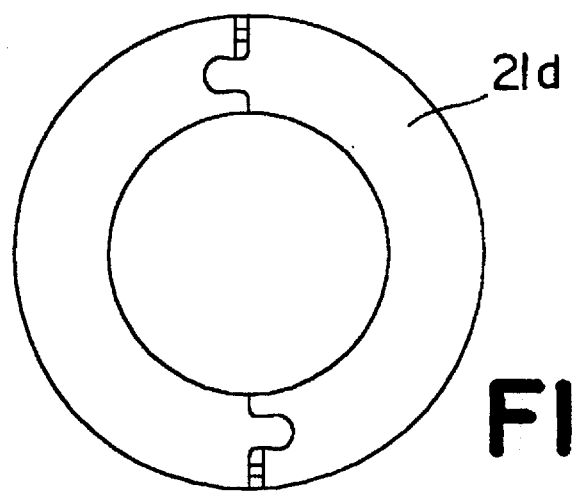
Figure 12:
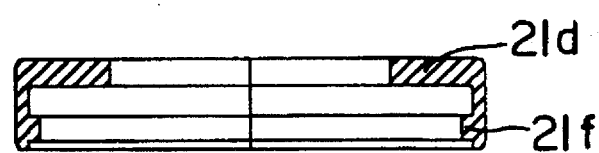
Figure 13:
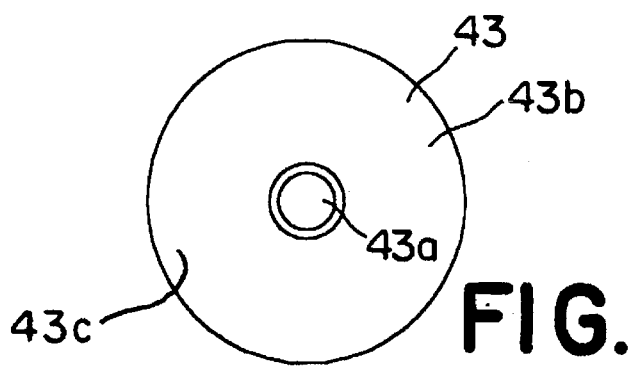
Figure 14:
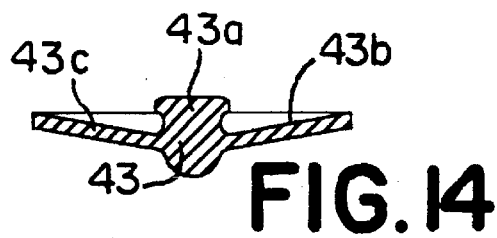
Figure 16:
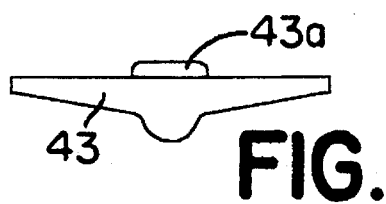
Figure 15:
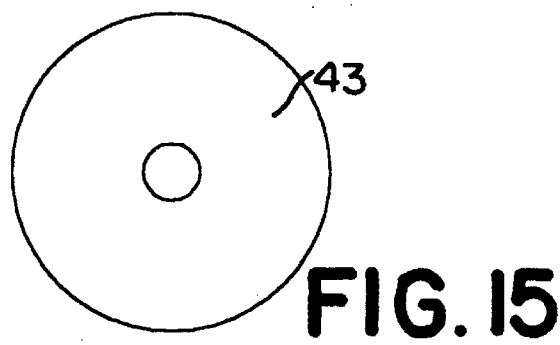
Figure 20:
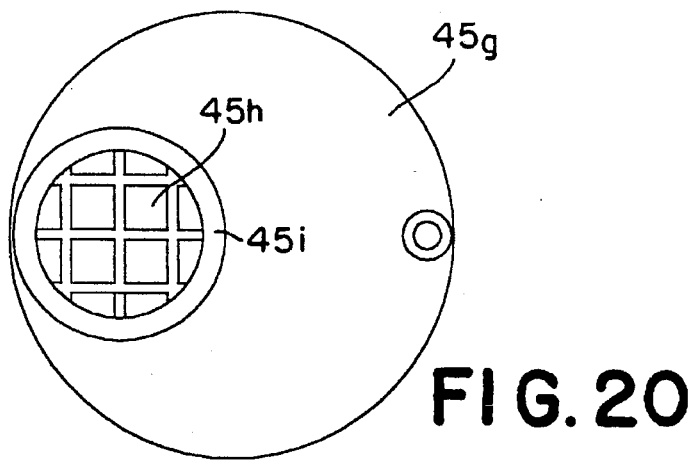
Figure 21:
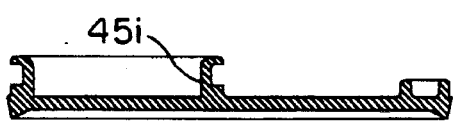
Figure 23:
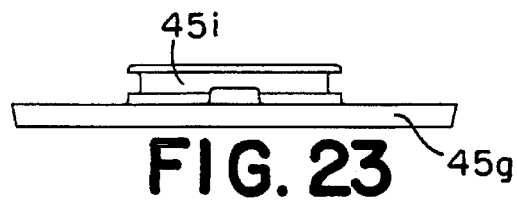
Figure 22:
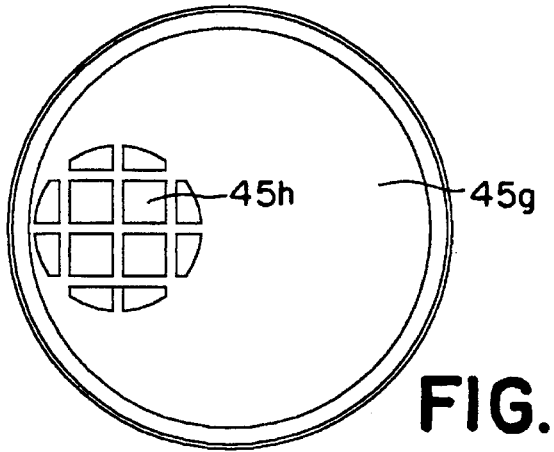
Figure 25:
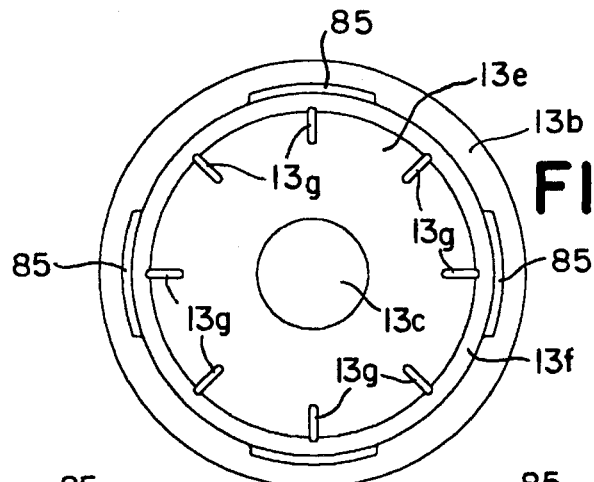
Figure 24:
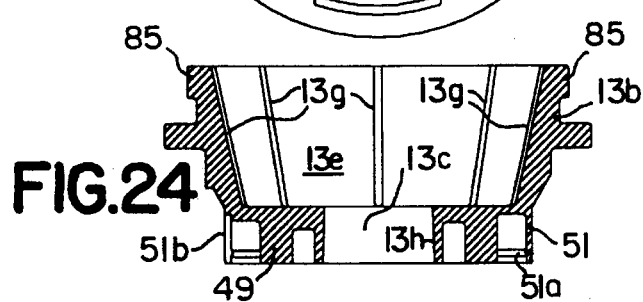
Figure 27:
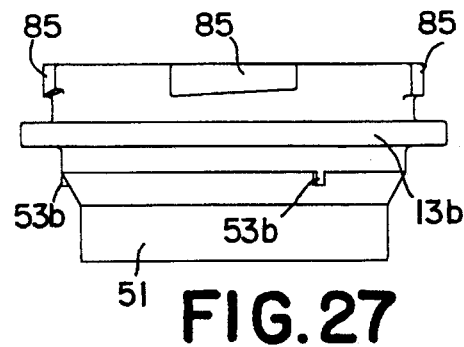
Figure 26:
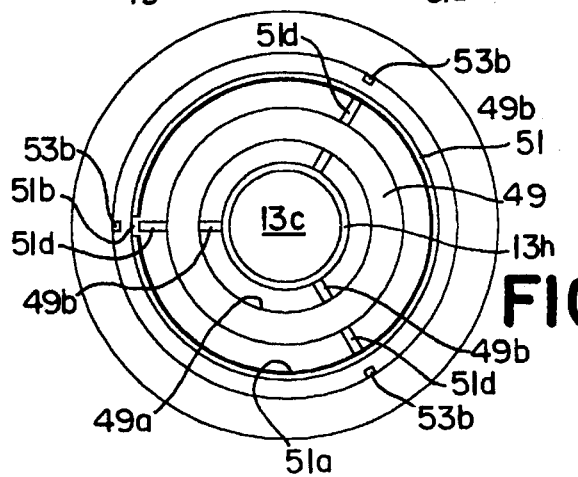
Figure 30:
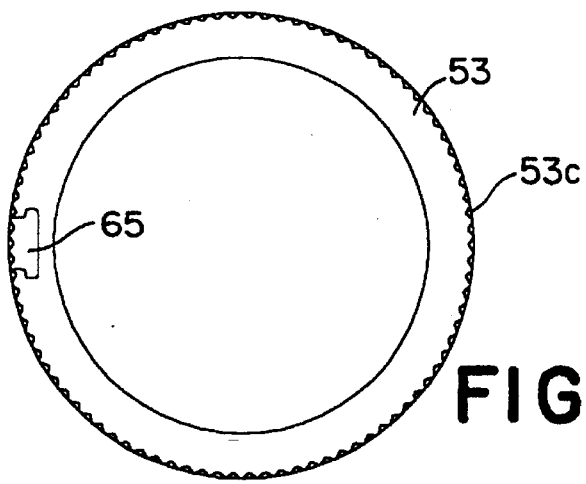
Figure 28:
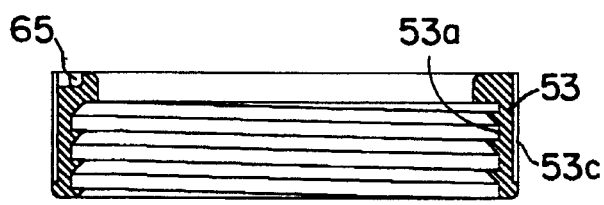
Figure 29:
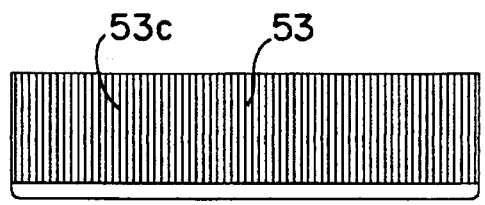
Figure 35:
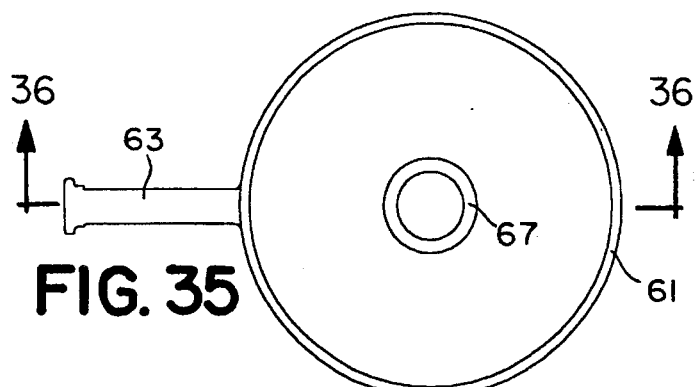
Figure 36:
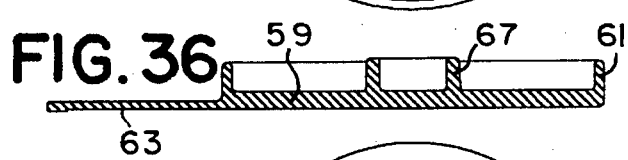
Figure 38:
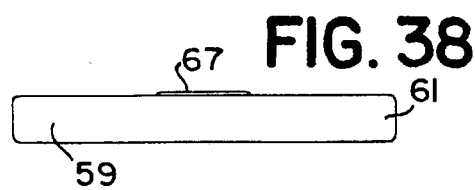
Figure 37:
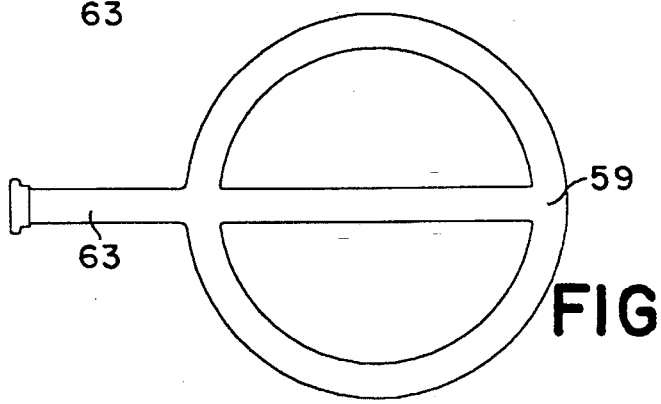
Figure 39:
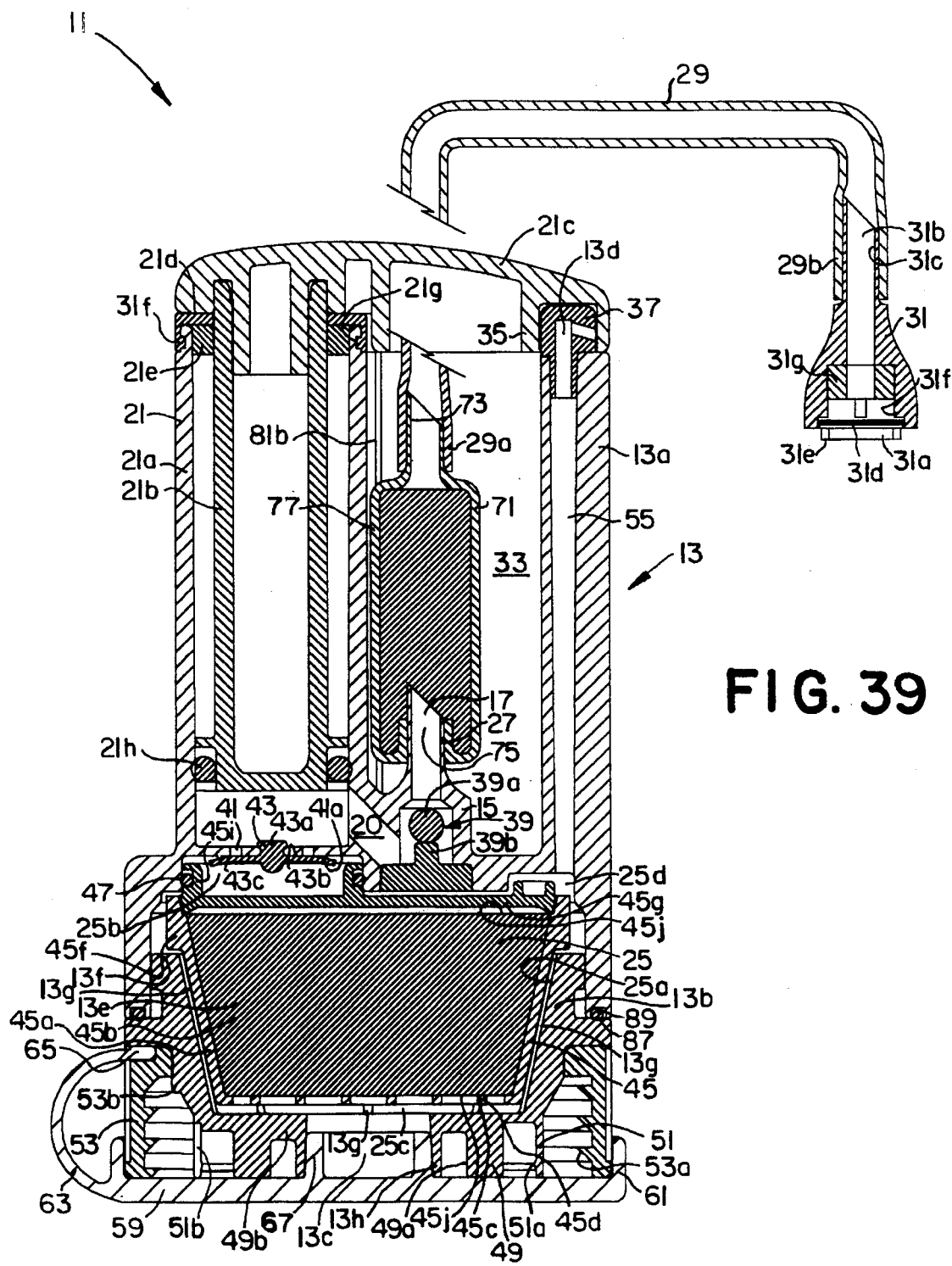

FIG. 7 is a view in top plan of the pump handle;

FIG. 8 is a view in cross section of the pump handle;

FIG. 9 is a view in bottom plan of the pump handle;

FIG. 10 is a view in side elevation of the pump barrel;

FIG. 11 is a view in top plan of a two-piece snap disk 21d;

FIG. 12 is a view in cross section of the snap disk 21d;

FIG. 13 is a view in top plan of a rubber disk 43;

FIG. 14 is a view in cross section of the rubber disk 43;

FIG. 15 is a view in bottom plan of the rubber disk 43;

FIG. 16 is a view in front elevation of the rubber disk 43;

FIG. 17 is a cross sectional view of canister housing 45a;

FIG. 18 is a view in front elevation of the canister housing 45a;

FIG. 19 is a view in bottom plan of the canister housing 45a;

FIG. 20 is a view in top plan of a canister cap 45g;

FIG. 21 is a view in cross section of the canister cap 45g;

FIG. 22 is a view in bottom plan of the canister cap 45g;

FIG. 23 is a view in side elevation of the canister cap 45g;

FIG. 24 is a view in cross section of the bottom cap 13b prior to the third annular ring 53 being spin welded thereto;

FIG. 25 is a view in top plan of the bottom cap 13b shown in FIG. 24;

FIG. 26 is a view in bottom plan of the bottom cap 13b shown in FIG. 24;

FIG. 27 is a view in front elevation of the bottom cap 13b shown in FIG. 24;

FIG. 28 is a view in cross section of third annular ring 53 prior to being spin welded onto the bottom cap 13b;

FIG. 29 is a view in front elevation of the third annular ring 53 shown in FIG. 28;

FIG. 30 is a view in top plan of the third annular ring 53 shown in FIG. 28;

FIG. 31 is a view in top plan of the bottom cap 13b after the third annular ring 53 has been spin welded thereto;

FIG. 32 is a view in cross section taken along the lines and arrows 32–32 shown in FIG. 31;

FIG. 33 is a view in bottom plan of the bottom cap 13b of FIG. 31;

FIG. 34 is a view in front elevation of the bottom cap 13b shown in FIG. 31;

FIG. 35 is a view in top plan of the cover 59 for the bottom cap 13b;

FIG. 36 is a view in cross section taken along the lines and arrows 36–36 shown in FIG. 35;

FIG. 37 is a view in bottom plan of the cover 59 of FIG. 35;

FIG. 38 is a view in side elevation taken from the right of the cover 59 of FIG. 35; and FIG. 39 is a view in cross section of the portable drinking water filtration apparatus 11 constructed in accordance with the invention in combination with an optional cartridge for pre-filtering and/or biocidal treating mounted thereto.

DETAILED DESCRIPTION OF THE DRAWINGS

Figure 1:
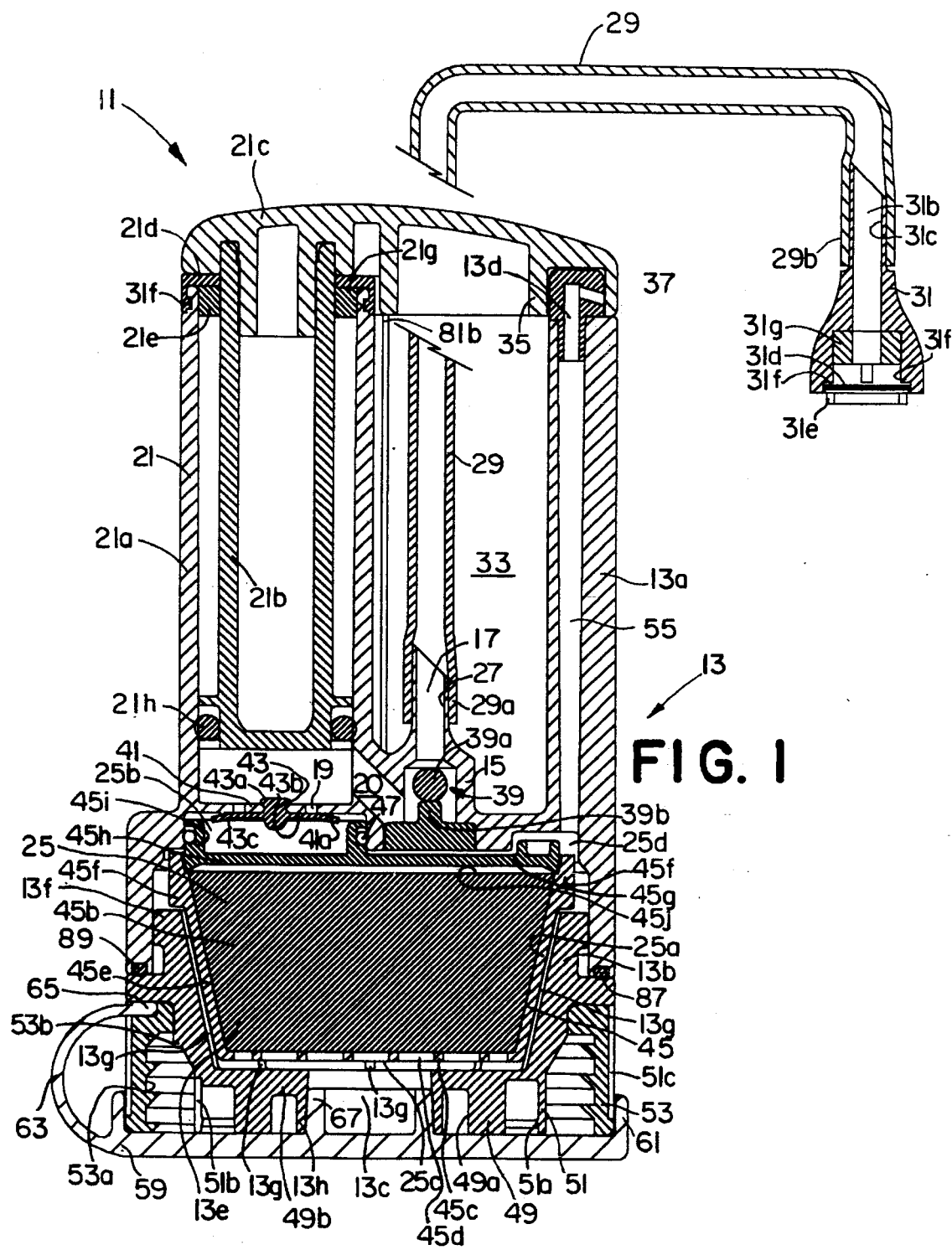
FIG. 1 is a view in cross section of the portable drinking water filtration apparatus constructed in accordance with the invention.

Turning to the drawings, there is shown in FIG. 1 a portable drinking water filtration apparatus 11 for filtering and/or purifying water that comprises a housing 13 having a cylinder-like wall 13a and a bottom cap 13b attached to the lower end portion of the wall 13a forming a container.

4

Referring to FIGS. 1 and 3, a pump block 15 is formed in the housing 13, and the pump block 15 has a water inlet port 17, a water outlet port 19, and a passageway 20 extending through the pump block 15 between the inlet port 17 and the outlet port 19.

As shown in FIG. 1, a pump 21 is provided in the pump block 15 for pumping water from the inlet port 17 to the outer port 19 and has a pump barrel 21a and a piston 21b mounted in the pump barrel 21a for back and forth movement inside the pump barrel 21a.

A piston handle 21c is mounted on top of the piston 21b so that the piston handle 21c may be grasped and moved up and down to pump the piston 21b up and down.

First valve means is positioned at the first inlet port 17 of the pump block 15 for blocking flow of water from the passageway 20 out through the water inlet port 17.

A filtration chamber 25 is positioned inside the housing 13 beneath the water outlet port 19 of the pump block 15 and is defined by chamber walls 25a. Filtration chamber 25 has a water inlet opening 25b that is positioned to receive water from the water outlet port 19 of the pump block 15.

Second valve means is positioned at the outlet port 19 of the pump block 15 for blocking flow of water from the filtration chamber 25 back into the pump block 15.

The filtration chamber 25 has a water outlet opening 25c that recesses water to an outlet port 13c defined in part by an annular ring 13h that is integral with and extends from the outside surface of the bottom cap 13b of the housing 13.

Filtration means is positioned in the filtration chamber 25 for filtering and/or purifying water.

Sealing means is provided for sealing between the filtration means and the filtration chamber walls 25a at the water inlet opening 25b of the filtration chamber 25 and for preventing water from the pump 21 from entering the first water outlet opening 25c of the filtration chamber 25 without first flowing through the filtration means.

First bottle connection means is formed on bottom cap 13b and surrounds first outlet port 13c of cap 13b of the housing 13 for connecting the bottom cap 13b of the housing 13 to the mouth of a bottle to permit water to flow from the first water outlet opening 25c of the filtration chamber 25 to and through the outlet port 13c in the bottom cap 13b of the housing 13 into the bottle.

Air venting/second water outlet opening means, in contact with the first water outlet opening 25c of the filtration chamber 25, are provided in housing 13 for venting air from a bottle connected to the bottom cap 13b as water is pumped from the drinking water filtration apparatus 11 through the water outlet port 13c of the bottom cap 13b into the bottle and for channeling water to an alternative outlet port 13d formed in the wall 13a of housing 13 when the outlet port 13c in the bottom cap 13b is plugged.

Water may be pulled into the pump block 15 through the water inlet port 17 of the pump block 15, and pumped through the pump block 15, through the filtration means, out the first water outlet opening 25c of the filtration chamber 25, and through the outlet port 13c of the bottom cap 13b into a bottle mounted on the first bottle connection means, or, if the water outlet port 13c in bottom cap 13b is plugged, pumped from the first water outlet opening 25c to a second water outlet opening 25d of filtration chamber 25 and through the alternative outlet port 13d in the wall 13a of housing 13.

The water inlet port 17 of the pump block 15 is defined by a hollow inlet barb 27. A flexible tube 29 is provided that has a first end portion 29a and a second end portion 29b. The first end portion 29a of the tube 29 secures onto the inlet barb 27, and the second end portion 29b of the tube 29 attaches to an inlet strainer/tubing weight 31.

Figure 5:
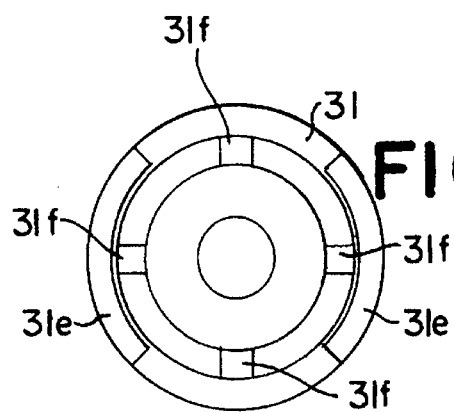
FIG. 5 is a view in bottom plan of the inlet strainer/tubing weight 31 shown in FIG. 1 but without the screen 31d attached thereto.
Figure 6:
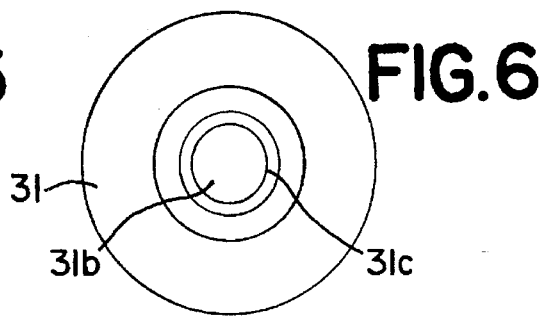
FIG. 6 is a view in top plan of the inlet strainer/tubing weight 31 shown in FIG. 1 but without the tube 29 attached to the inlet strainer/tubing weight 31.

Inlet strainer/tubing weight 31, as shown in FIGS. 1, 5, and 6, includes a hollow housing preferably made of rubber or a thermoplastic elastomer having an inlet opening 31a, outlet opening 31b defined by a hollow outlet barb 31c, a wire screen 31d secured across inlet opening 31a for filtering out coarse debris as water is drawn into the inlet opening 31a, and a pair of spaced-apart legs 31e extending perpendicularly away from screen 31d.

The circumference of wire screen 31d digs into the housing of the inlet strainer/tubing weight 31 to secure the screen 31d in place. Four equally spaced apart pedestals 31f are formed in the housing of the inlet strainer/tubing weight 31 to aid in positioning screen 31d. Legs 31e are provided so that water may be drawn into the tube 29 through the inlet strainer/tubing weight 31 even when the inlet strainer/tubing weight 31 is standing on its legs 31e since water may gain access to the inlet opening 31a by flowing between the legs 31e.

Inlet strainer/tubing weight 31 is provided with an annular brass weight 31g mounted inside its housing to ensure that it is heavier than water so as to sink the second end portion 29b of tube 29 below the surface of the water source.

A storage compartment 33 is formed inside the housing 13 for storing the tube 29 and the inlet strainer/tubing weight 31 when the portable drinking water filtration apparatus 11 is not in use.

Referring to FIGS. 1, and 7–10, the piston handle 21c is sized to engage the upper end portion of the wall 13a of the housing 13 to enclose the storage compartment 33 when the piston 21b is in a down position. The piston handle 21c (FIGS. 1, 8, and 9) is provided with a downwardly extending ring 35 that covers a spout 37 (FIG. 1) provided at the alternative outlet port 13d to segregate the spout 37 from any untreated water that may leak into the storage compartment 33 from the tube 29 when tube 29 is being stored in the storage compartment 33.

Referring to FIGS. 1, 11 and 12, a two-piece snap disk 21d captures the piston 21b in pump barrel 21a, and may be easily unsnapped to allow disassembly, cleaning, and replacement of worn or damaged parts in the pump 21.

An annular ring 21e (FIG. 1) having an inner diameter that is slightly larger than the outer diameter of the piston 21b is press fit into the top of the pump barrel 21a, with piston 21b extending through the opening of the ring 21e. Annular ring 21e restricts lateral movement of the piston 21b in pump barrel 21a. Without annular ring 21e, hard lateral banging of the piston 21b against the snap disk 21d may dislodge the snap ring disk 21d from the pump barrel 21a resulting in the piston 21b no longer being captured in pump barrel 21a.

First valve means includes a check valve 39 (FIG. 1) that comprises a ball 39a positioned inside passageway 20 of the pump block 15 that is adapted to close the water inlet port 17 of the pump block 15 when the ball 39a covers the water inlet port 17 of the pump block 15. Ball 39a preferably has a specific gravity of less than the specific gravity of water. Preferably, ball 39a is made from low density polyethylene. Ball 39a is positioned in the passageway 20 of the pump block 15 close to the water inlet port 17 of the pump block 15 by a pedestal plug 39b that forms a part of the pump block 15 and that has a portion that protrudes into passageway 20 preventing the ball 39a from moving in passageway 20 beyond the pedestal plug 39b. Passageway 20 at check valve 39 is sized to be larger that the diameter of the ball 39a, and the diameter of ball 39a is larger than the diameter of the water inlet port 17.

Referring to FIGS. 1–4, second valve means includes a perforated disk 41 extending across the passageway 20 of the pump block 15 at the water outlet port 19 of the pump block 15. A flexible rubber disk 43 (FIGS. 1, and 13–16) is mounted on the underside of the perforated disk 41 as shown in FIG. 1 by a cylindrical tab 43a of rubber disk 43 that extends through a central opening in the perforated disk 41. The face 43b of rubber disk 43 that is adjacent to the underside of the perforated disk 41 has a concave shape prior to being mounted on the perforated disk 41. When the rubber disk 43 is mounted on the perforated disk 41, rubber disk face 43b is pulled against the an annular seating rim 41a formed on the underside of perforated disk 41, causing the portion 43c of the rubber disk 43 that surrounds the cylindrical tab 43a to be biased towards the perforated disk 41 and cover the perforations in the perforated disk 41 to block flow of water through the perforations in the perforated disk 41. Because the rubber disk 43 is flexible, the portion 43c of rubber disk 43 surrounding the cylindrical tab 43a may be deflected away from the perforated disk 41 to expose the perforations therein when water is pumped from the pump block 15 through the perforated disk 41 permitting flow of water from the pump block 15 into the filtration chamber 25. If water is not being pumped from the pump block 15 through the perforated disk 41, pushing the portion 43c surrounding the cylindrical tab 43a of the rubber disk 43 away from the perforated disk 41 to uncover the perforations in the perforated disk 41, the flexible portion 43c of rubber disk 43 springs back to cover the perforations in perforated disk 41, thereby blocking flow of water from filtration chamber 25 back into the pump block 15.

Referring to FIGS. 1, and 17–19, the filtration means includes a filtration canister 45 having a canister housing 45a. As shown in FIG. 1, a filtration media or material 45b for filtering and/or purifying water is positioned inside the canister housing 45a. The filtration canister housing 45a has a bottom wall 45c that is provided with a water outlet grid opening 45d, and a frustoconical side wall 45e extends upwardly from the bottom wall 45c.

A plurality of gussets 45f are formed on the outside surface of the frustoconical side wall 45e of filtration canister housing 45a.

A canister cap 45g, which is shown in FIGS. 1, and 20–23, is circumferentially connected to the top portion of the frustoconical side wall 45e, and the canister cap 45g has a water inlet grid opening 45h that is surrounded by an upwardly extending collar 45i.

The filtration material 45b has a 0.1 micron (0.4 absolute) to a 10 micron retention for removing chemicals, microbiological, and fine particulate contamination. Filter paper 45j (FIG. 1) may be positioned between canister cap 45g and filtration material 45b and between filtration material 45b and bottom wall 45c of canister housing 45a.

The canister housing 45a and the canister cap 45g preferably are made of plastic.

The filtration canister 45 may be obtained from General Ecology, Inc. of Exton, Pennsylvania.

The sealing means includes a sealing member 47, such as an O-ring shown in FIG. 1, that surrounds the outer surface of the collar 45i for sealing between the collar 45i and the chamber walls 25a of filtration chamber 25 at the water inlet opening 25b of the filtration chamber 25.

Referring to FIGS. 1, 31, and 32, the bottom cap 13b of the housing 13 has a frustoconical recess 13e formed in its inside surface to receive the filtration canister 45. As shown in FIG. 1, bottom cap 13b has a ledge portion 13f surrounding the circumference of the recess 13e for engagement with the bottom of the gussets 45f of the canister housing 45a to position the sealing member 47 surrounding the collar 45i against the chamber walls 25a of the filtration chamber 25 at the water inlet opening 25b of the filtration chamber 25 to seal between the collar 45i of the canister cap 45g and the chamber walls 25a of the filtration chamber 25 at the water inlet opening 25b of the filtration chamber 25 and to space the bottom wall 45c of the canister housing 45a away from the inside surface of the bottom cap 13b.

A plurality of riser grooves 13g are formed in the inside surface of the bottom cap 13b in recess 13e that extend between the bottom of the recess 13e and the ledge portion 13f for providing a path to the alternative outlet port 13d formed in the wall 13a of housing 13.

As shown in FIG. 4, a support rib 13i is formed in the bottom wall 13j of top wall section 13a. When filtration chamber 25 is pressurized by pumping water into it, the filtration canister cap 45g tends to bow out toward the bottom wall 13j of top wall section 13a, and support rib 13i restricts this bowing.

Referring to FIGS. 1, 32, and 33, first bottle connection means includes a first annular ring 49 that is integral with and extends from the outside surface of the bottom cap 13b of the housing 13. The inner diameter of the annular ring 49 is sized such that the inner cylindrical surface 49a of the ring 49 receives snugly the outer surface of the mouth of a plastic soda bottle or the like when the mouth of the bottle is placed inside ring 49. In order to guard against the soda bottle sealing tightly against annular ring 49 and to provide an additional egress for air displaced from the soda bottle as water fills the soda bottle, a plurality of spacing lugs 49b extends downwardly from the outer surface of bottom cap 13b between annular rings 13h and 49 to block the rim of the mouth of the soda bottle from abutting against the outer surface of the bottom cap 13b, thereby permitting air to flow over the rim of the mouth of the soda bottle and along the outside surface of the mouth of the soda bottle in the space between the threads on the outside surface of the mouth of the soda bottle.

Second bottle connector means is also formed on the bottom cap 13b of the housing 13 for connecting the bottom cap 13b to a bottle, such as a biker bottle, which and has a wider mouth than the mouth of the bottle adapted to be connected to the first ring 49. Second bottle connection means includes a second annular ring 51 extending from and integral with the outside surface of the bottom cap 13b. The second ring 51 is spaced apart from and is concentric with the first ring 49, and the second ring 51 is provided with an annular shoulder 51a formed on the inner surface of the second annular ring 51 for receiving the external groove formed in the external surface of a mouth of a biker bottle. The second ring 51 is interrupted with at least one slot 51b extending through it to help prevent a biker bottle from sealing tightly against the inner surface of the second annular ring 51. The slot 51b provides an additional egress for air displaced from a biker bottle connected to ring 51 as water fills it. A plurality of spacing lugs 51d extend downwardly from the outer surface of the bottom cap 13b between annular rings 49 and 51 to create a space between the rim of the mouth of the biker bottle and the outer surface of the bottom cap 13b. Because of this, air displaced from the biker bottle may flow over the rim of the mouth of the biker bottle and down slot 51b.

Third bottle connection means is also formed on the bottom cap 13b for connecting the bottom cap 13b to a bottle having a wider mouth than the mouth of the bottle adapted to be connected to the second ring 51. Third bottle connection means includes a third annular ring 53 that is spin welded to the side portion of the bottom cap 13b. The third ring 53 is spaced apart from and is concentric with the second ring 51, and is provided with a threaded inner surface 53a for receiving an external thread on the mouth of an wide mouth trail bottle.

In order to guard against the wide mouth trail bottle sealing tightly against annular ring 53 and to provide an additional egress for air displaced from a wide mouth trail bottle threaded onto ring 53 as water fills the wide mouth trail bottle, a plurality of spacing fins 53b are provided that extend downwardly from the outer surface of bottom cap 13b inside the third annular ring 53 to block the rim of the mouth of the wide mouth trail bottle from abutting against the outer surface of the bottom cap 13b, thereby creating a space between the outer surface of bottom cap 13b and the rim of the mouth of the wide mouth trail bottle when threaded onto ring 53 to permit air to flow over the rim of the mouth of the wide mouth trail bottle and down around the external surface of the mouth in the space created between the threads on the external surface of the mouth of the wide mouth trail bottle and the corresponding surface of third ring 53.

Third ring 53 has a knurled outer surface 53c to aid in gripping apparatus 11.

As shown in FIG. 1, the air venting/second water outlet opening means includes a channel 55 that extends from the filtration chamber 25 to the alternative water outlet port 13d. The channel 55 has spout 37 mounted in it at the alternative water outlet port 13d to aid in the discharging of water from apparatus 11 when water is discharged from the alternative water outlet port 13d.

Referring to FIGS. 1, and FIGS. 35–38, a cover 59 is provided to cover the outer surface of the bottom cap 13b, and specifically, the first, second and third bottle connection means when the outlet port 13c of the bottom cap 13b is not being used. Cover 59 is provided with an upwardly-extending lip 61 at the circumference of the cover 59 which fits around the circumference of the bottom cap 13b to hold the cover 59 on bottom cap 13b.

Cover 59 is provided with a tail 63 having a T-shaped end portion that is sized to fit into a T-shaped recess 65 formed in the outer surface of the third ring 53.

Cover 59 is also provided with a plug 67 that is aligned with the first water outlet port 13c in bottom cap 13b. By inserting plug 67 into the first water outlet port 13c in bottom cap 13b, water being treated by apparatus 11 moves from the second water outlet opening 25c of filtration chamber 25 to the channel 55 via riser grooves 13g, and out through spout 37 at the alternative outlet opening 13d into a container.

FIG. 39 shows the portable drinking water apparatus 11 of the invention in combination with a cartridge 71. Cartridge 71 includes a material housed in the cartridge 71 for pre-filtering and/or for biocidal treating unpurified water, a hollow inlet barb 73 for gaining access to the material housed in the cartridge 71, and an outlet port 75. The material housed in cartridge 71 may be pre-filtration material such as paper, a granular filter membrane, a pleated membrane, an annular membrane, or combinations thereof for filtering out dirt and other impurities that may be in the unpurified water. The material may also be biocidal material such as iodine or ferric chloride for treating disease bacteria and virus particles that may be in the unpurified water. The biocidal material may be used alone or in combination with the pre-filtration material.

To avoid having the cartridge 71 being loose or being banged around during use with apparatus 11, the cartridge 71 is provided with a T-shaped flange 77 that slides into a T-shaped recess 79 formed by a pair of vertically extending ridges 81a and 81b formed on pump barrel 21a.

Cartridge 71 is connected to apparatus 11 by sliding the T-shaped flange 77 of cartridge 71 into the T-shaped recess 79 so that the inlet barb 27 is inserted into the outlet port 75 of the cartridge 71. The first end portion 29a of tube 29 is then secured onto the hollow inlet barb 73 of the cartridge 71.

Storage compartment 33 is sized to store the cartridge 71, the tube 29, and the inlet strainer/tubing weight 31 when the portable drinking water filtration apparatus 11 is not in use.

To assemble apparatus 11, the rubber disk 43 is mounted on the underside of perforated disk 41 by inserting cylindrical tab 43a of rubber disk 43 through a central opening in perforated disk 41, thereby pulling rubber disk face 43b against the perforated disk 41 and the seating rim 41a of the perforated disk 41 to cover the perforations in the perforated disk 41.

Then, annular ring 21e is placed around piston 29b and handle 21c is welded to the top of the piston 21b.

Piston 29b is inserted into the pump barrel 29a, and annular ring 21e is press fit into the top of the pump barrel 21a. The two-piece snap disk 21d is then snapped together over the top portion of pump barrel 21a such that an annular inwardly extending shoulder 31f of snap disk 21d sits in an annular groove 21g formed in the outer surface of the top portion of pump barrel 21a to capture piston 21b in pump barrel 21a.

Prior to insertion into pump barrel 21a, piston 21b is provided with a sealing member such as an O-ring or a quad seal 21h, as shown in FIG. 1, at the outer circumference of the bottom portion of the piston 21b to seal between the piston 21b and the pump barrel 21a.

Filtration canister 45 is placed into the recess 13e formed in bottom cap 13b, and bottom cap 13b is screwed onto wall 13a, the interrupted threads 83 (FIG. 4) formed in the bottom portion of top wall 13a engaging the interrupted threads 85 (FIGS. 27 and 34) formed in the upper end portion of bottom cap 13b.

Prior to screwing bottom cap 13b onto top wall 13a, a sealing member such as an O-ring seal 87 is placed in an annular groove 89 formed in the bottom of top wall 13a to seal between bottom cap 13b and top wall 13a.

Check valve 39 is assembled by inserting ball 39a into passageway 20 and positioning ball 39a at the proper location in passageway 20 by sealingly mounting pedestal plug 39b to pump block 15 at opening 91 in pump block 15.

Spout 37 is pushed into the upper end portion of channel 55.

Cover 59 is secured to bottom cap 13b by inserting its tail 63 into recess 65 formed on the outer surface of third ring 53.

In operation, piston handle 21c may be pulled upwardly and turned to expose storage chamber compartment 33. Then, the first end portion 29a of tube 29 may be attached to the hollow inlet barb 27.

If it is desired to have the filtered/purified water pumped directly into a bottle, the cover 59 is pulled off the outer circumference of the third annular ring 53 to expose the first outlet port 13c in bottom cap 13, and the first, second, and third bottle connection means. The bottle, depending on its type, is mounted onto one of the first, second, or third bottle connection means. For instance, a soda bottle may be mounted on the first bottle connection means by placing the mouth of the soda bottle inside ring 49 so that the exterior thread on the mouth of the soda bottle is next to the inner cylindrical surface 49a of the first annular ring 49. Or, a biker bottle may be mounted on the second bottle connection means by inserting the mouth of the biker bottle between the first annular ring 49 and the second annular ring 51 such that the mouth of the biker bottle snaps on or engages the shoulder 51a of annular ring 51. Or, a wide mouth trail bottle may be mounted on the third bottle connection means by screwing the external thread on the mouth of the wide mouth trail bottle into the thread 53a in the third annular ring 53.

Then, inlet strainer/tubing weight 31, which connects to the second end portion 29b of the tube 29, may be placed into a water source, such as a stream.

Water is then pumped through the portable drinking water filtration apparatus 11 into the bottle attached thereto by moving the piston 21b up and down in pump barrel 21a by repeatedly moving piston handle 21c up and down.

Each upward stroke of the piston 21b pulls water through the screen 31d of the inlet strainer/tubing weight 31, through tube 29, through the water inlet port 17 of the pump block 15, through the portion of passageway 20 between the water inlet port 17 of pump block 15 and the pump 21, through the port of the pump barrel 21a, and into pump barrel 21a.

Each downstroke of piston 21b pushes the water from pump barrel 21a, through the port of pump barrel 21a into the passageway 20 of the pump block 15, through the water outlet port 19 of pump block 15 by deflecting the portion 43c of rubber disk 43 away from the perforated disk 41 to expose the perforations in the perforated disk 41, through the filtration canister 45 in the filtration chamber 25, and out the first water outlet opening 25c of filter chamber 25 and the first outlet port 13c in bottom cap 13b into the bottle mounted on the bottom cap 13b. When water is expelled from pump barrel 21a into passageway 20, the expelled water pushes ball 35a of check valve 35 over the water inlet port 17 to block flow of water from passageway 20 out through the water outlet port 17.

Air displaced from the bottle mounted on the bottom cap 13b by water being pumped into the bottle may be vented from the bottle by venting from the bottle through the first outlet port 13c of bottom cap 13b, through the first water outlet opening 25c of filtration 25, along riser grooves 13g to channel 55, and through channel 55 to and out through spout 37. Additionally, air is vented from a bottle by moving over the rim of the mouth of the bottle and through the space between the outer surface of the bottle mouth and the corresponding inner surface of the annular rings 49 or 53, or with a biker bottle, by moving over the rim of the biker bottle and down along slots 51b.

Alternatively, the filtered/purified water may be pumped through portable drinking water filtration apparatus 11 and out the alternative outlet port 13d, rather than out through first outlet port 13c. To accomplish this, cover 59 is secured over bottom cap 13b such that plug 67 of cover 59 plugs outlet port 13c of bottom cap 13b. With outlet port 13c plugged, the water being pumped through apparatus 11 leaves apparatus 11 by moving along riser grooves 13f from the first water outlet opening 25c up towards channel 55, and through channel 55 to and out from spout 37 at the alternative outlet port 13d into a waiting container.

Portable drinking water filtration apparatus 11 may be used in combination with a pre-filtering and/or biocidal cartridge 71 by sliding the T-shaped flange 77 of cartridge 71 into the T-shaped recess 79 adjacent to the exterior of the pump barrel 21a so that the inlet barb 27 is inserted into the outlet port 75 of the cartridge 71. The first end portion 29a of tube 29 is then secured onto the hollow inlet barb 73 of the cartridge 71 and the inlet strainer/tubing weight 31 is connected to the second end portion 29b of the tube 29. Then, after the inlet strainer/tubing weight 31 is placed into a water source, water may be pumped through tube 29, cartridge 71, and the portable drinking water filtration apparatus 11 by moving the piston 29b up and down in piston barrel 21a by repeatedly moving piston handle 21c up and down.

Where unpurified water may contain bacteria and virus particles, apparatus 11 may be used to treat water that has undergone a biocidal pre-treatment. In particular, water that may contain bacteria or viruses may be pre-treated with a biocide such as Potable Aqua tablets made by Wisconsin Pharmacal Co., Inc., to destroy the bacteria and viruses. Then, such water may be pumped through apparatus 11 by placing the second end portion 29b of tube 29 in the biocidal treated water and pulling said water through the tube 29 into and through the apparatus 11 by repeatedly moving piston handle 21c up and down.

The housing 13 of apparatus 11 preferably is made from a plastic such as ABS plastic. Tube 29 and cover 59 may be made from plastic, rubber, or the like. Cartridge 71 may be made from flexible plastic, rubber or the like. If cartridge 71 is made from a hard material, a flexible insert or a seal may be provided around outlet port 75 to improve the connection between barb 27 and the cartridge 71 at outlet port 75.

ADVANTAGES

The portable drinking water filtration apparatus 11 is small enough and light enough to be carried in a backpack, a belt pack, a suitcase, a brief case, and the like. Preferably, apparatus 11 weighs seven ounces and is a petite 5.5 inches high and a slender 2.75 inches in diameter.

Apparatus 11 removes herbicides, pesticides, organics, sediment, fowl tastes, odors, colors, Giardia, Cryptosporidium, parasitic cysts, asbestos, algae, and other harmful contaminants, and when used in conjunction with a biocide, removes waterborne bacteria and viruses.

Apparatus 11 easily connects to or receives standard wide mouth trail bottles, most bike bottles, and even ordinary soda bottles. Plus, apparatus 11 is provided with an alternative outlet port 13d having a spout 37 built therein to direct purified water into a container or the like.

The filtration material 45b is contained in the filtration canister housing 45a. Accordingly, pathogens trapped in the filtration material 45b of a used filtration canister 45 do not come into contact with a person when replacing a used filtration canister 45 with a new filtration canister 45 since the person only handles the housing 45a of filtration canister 45 and does not come into contact with the contaminated filtration material 45b. When replacing a used filtration canister 45 with a new filtration canister 45, there is no messy cleaning and no dangerous brushing.

Cover 59, when plugging first outlet port 13c and covering first, second, and third bottle connection means, provides a cushioned, flat supporting surface for apparatus 11 when water is being pumped through apparatus 11 and out the alternative outlet port 13d.

Apparatus 11 is capable of providing a substantial amount of purified water, for example, about one or two cups of microfiltered water per minute.

We claim:

1. A portable drinking water filtration apparatus (11) for filtering and purifying water comprising a housing (13) having a cylinder-like top wall (13a) and a bottom cap (13b) attached to a lower end portion of the wall (13a) forming a container, a pump block (15) formed in the housing (13), the pump block (15) having a water inlet port (17), a water outlet port (19), and a passageway (20) extending through the pump block (15) between the inlet port (17) and the outlet port (19), a pump (21) in the pump block (15) for pumping water from the inlet port (17) to and through the outer port (19), the pump (21) having a pump barrel (21a) and a piston (21b) mounted in the pump barrel (21a) for back and forth movement inside the pump barrel (21a), a piston handle (21c) mounted on top of the piston (21b) so that the piston handle (21c) may be grasped and moved up and down to pump the piston (21b) up and down, first valve means positioned in the pump block (15) at the first inlet port 17 for blocking flow of water from the passageway (20) out through the water inlet port (17), a filtration chamber (25) positioned inside the housing (13) beneath the water outlet port (19) of the pump block (15), the filtration chamber (25) having chamber walls (25a), the filtration chamber (25) having a water inlet opening (25b) being positioned for receiving water from the water outlet port (19) of the pump block (15), second valve means positioned at the outlet port (19) of the pump block (15) for blocking flow of water from the filtration chamber (25) back into the pump block (15), the filtration chamber (25) having a first water outlet opening (25c) that recesses water to an outlet port (13c) in the bottom cap (13b) of the housing (13), filtration means positioned in the filtration chamber for filtering and/or purifying water, sealing means for sealing between the filtration means and the filtration chamber walls (25a) at the water inlet opening (25b) of the filtration chamber (25) and for preventing water from the pump (21) from entering the first water outlet opening (25c) of the filtration chamber (25) without flowing through the filtration means, first bottle connection means formed on the bottom cap (13b) of the housing (13) for connecting the bottom cap (13b) of the housing (13) to a bottle to permit water to flow from the first water outlet opening (25c) of the filtration chamber (25) through the outlet port (13c) in the bottom cap (13b) of the housing (13) into the bottle, and air venting/second water outlet opening means in contact with the first water outlet opening (25c) of the filtration chamber (25) for venting air from a bottle as water is pumped from the drinking water filtration apparatus (11) through the water outlet port (13c) of the bottom cap (13b) into the bottle and for channelling water to an alterative outlet port (13d) formed in the wall (13a) of housing (13) when the outlet port (13c) in the bottom cap (13b) is plugged, wherein water may be pulled into the pump block (15) through the water inlet port (17) of the pump block (15), pumped through the pump block, through the filtration means, out the first water outlet opening of the filtration chamber, and through the outlet port (13c) of the bottom cap (13b) of the housing (13) into a bottle mounted on the first bottle connection means, or, if the water outlet port (13c) of the bottom cap (13b) is plugged, pumped from the first water outlet opening (25c) to a second water outlet opening (25d) and through the alternative outlet port (13d).

2. The portable drinking water filtration apparatus of claim 1, the water inlet port (17) of the pump block (15) comprising a hollow inlet barb (27), the portable drinking water filtration apparatus (11) further including a flexible tube (29) having a first end portion (29a) and a second end portion (29b), the first end portion (29a) of the tube (29) being mounted on the inlet barb (27), and straining and weighting means mounted on the second end portion (29b) of the tube (29) for straining water pulled into the tube (29) and for weighting the second end portion (29b) of the tube (29).

3. The portable drinking water filtration apparatus of claim 2, further including a storage compartment (33) formed inside the housing (13) for storing the tube (29) and the straining and weighting means when the portable drinking water filtration apparatus (11) is not in use.

4. The portable drinking water filtration apparatus of claim 1, the handle (21c) being sized to engage the upper end portion of the wall (13a) of the housing (13) to enclose the interior of the housing (13) when the piston (21b) is in a down position.

5. The portable drinking water filtration apparatus of claim 1, the pump barrel (21a) being closed at its upper end portion by a two-piece snap disk (21d) which captures the piston (21b) in the pump barrel (25a).

6. The portable drinking water filtration apparatus of claim 1, the first valve means being a check valve (39) including a ball (39a) positioned inside the passageway (20) of the pump block (15) and adapted to close the water inlet port (17) of the pump block (15) when the ball (39a) covers the water inlet port (17) of the pump block (15), the ball (39a) having a specific gravity of less than the specific gravity of water, and the ball (39a) being positioned in the passageway (20) of the pump block (15) at the water inlet port (17) of the pump block (15) by a pedestal plug (39b) that forms a part of the pump block (15).

7. The portable drinking water filtration apparatus of claim 1, the second valve means comprising a perforated disk (41) extending across the passageway (20) of the pump block (15) at the water outlet port (19) of the pump block (15), and a flexible rubber disk (43) mounted on the perforated disk (41) and covering the perforations therein, the rubber disk (43) being bias towards the perforated disk (41) to cover the perforations therein but being flexible enough to deflect away from the perforated disk (41) when water is pumped from the pump block (15) through the perforated disk (41) into the filtration chamber (25).

8. The portable drinking water filtration apparatus of claim 1, the filtration means comprising a filtration canister (45) having a canister housing (45a), and a filtration material (45b) for filtering and/or purifying water positioned inside the canister housing (45a).

9. The portable drinking water filtration apparatus of claim 8, the filtration canister housing (45a) having a bottom wall (45c) having a water outlet grid opening (45d) and a frustoconical side wall (45e) extending upwardly from the bottom wall (45c), a plurality of gussets (45f) formed on the outside surface of the frustoconical side wall (45e), a canister cap (45g) circumferentially connected to the top portion of the frustoconical side wall (45e), the canister cap (45g) having a water inlet grid opening (45h) that is surrounded by an upwardly extending cylindrical collar (45i), the collar (45i) having a sealing member (47) surrounding it for sealing between the collar (45i) and the chamber walls (25a) of filtration chamber (25) at the water inlet opening (25b) of the filtration chamber (25), the bottom cap (13b) of the housing (13) having a frustoconical recess (13e) formed in its inside surface to receive the filtration canister (45), the bottom cap (13b) having a ledge portion (13f) surrounding the circumference of the recess (13e) formed in its inside surface for engagement with the gussets (45f) of the canister housing (45a) to position the sealing member (47) surrounding the collar (45i) against the chamber walls (25a) of the filtration chamber (25) at the water inlet opening (25b) of the filtration chamber (25) to seal between the collar (45i) of the canister cap (45g) and the chamber walls (25a) of the filtration chamber (25) at the water inlet opening (25b) of the filtration chamber (25) and to space the bottom wall (45c) of the canister housing (45a) away from the inside surface of the bottom cap (13b), and a plurality of riser grooves (13g) formed in the inside surface of the bottom cap (13b) extending from the bottom of the recess (13e) in the bottom cap (13b) and the ledge portion (13f) for providing a path to the alterative outlet port (13d) formed in the wall (13a) of housing (13).

10. The portable drinking water filtration apparatus of claim 9, the canister housing (45a) and canister cap (45g) being made of plastic.

11. The portable drinking water filtration apparatus of claim 1, the filtration means having a 0.1 to 10 micron retention.

12. The portable drinking water filtration apparatus of claim 1, the first bottle connection means comprising an annular ring (49) extending from the outside surface of the bottom cap (13b) of the housing (13).

13. The portable drinking water filtration apparatus of claim 1, further including second bottle connector means formed on the bottom cap (13b) of the housing (13) for connecting the bottom cap (13b) of the housing (13) to a bottle having a larger mouth than the mouth of the bottle adapted to be connected to the first bottle connector means.

14. The portable drinking water filtration apparatus of claim 13, the second bottle connection means comprising a second annular ring (51) extending from the outside surface of the bottom cap (13b) of the housing (13), the second ring (51) being spaced apart from and being concentric with the first ring (49), the second ring (51) having annular shoulder (51a) formed on its inner surface for receiving the rim of a mouth of a biker bottle.

15. The portable drinking water filtration apparatus of claim 13, further including third bottle connection means formed on the bottom cap (13b) of the housing (13) for connecting the bottom cap (13b) of the housing to a bottle having a larger mouth than the mouth of the bottle adapted to be connected to the second bottle connection means.

16. The portable drinking water filtration apparatus of claim 15, the third bottle connection means comprising a ring (53) spin welded to the side portion of the bottom cap (13b) of the housing (13), the ring (53) having a knurled outer surface (53c) to aid gripping of the apparatus (11), the ring (53) having a threaded inner surface (53a) for receiving a threaded mouth of a wide mouth trail bottle.

17. The portable drinking water filtration apparatus of claim 15, further including plug and cover means for plugging the outlet port (13c) of the bottom cap (13b) of the housing (13) and for covering the first, second and third bottle connection means when the outlet port (13c) of the bottom cap (13b) of the housing (13) is plugged to keep the outside surface of the bottom cap (13b) clean.

18. The portable drinking water filtration apparatus of claim 1, the air venting/second water outlet opening means including a channel (55) extending from the filtration chamber (25) to the alternative water outlet port (13d), the channel (55) having an end portion having a spout (37) mounted therein, and further including plug means for plugging the outlet port (13c) of the bottom cap (13b) of the housing (13).

19. The portable drinking water filtration apparatus of claim 1, the inlet port (17) of the pump block (15) comprising a hollow inlet barb (27), a cartridge (71) mounted on the hollow inlet barb (27) of the pump block (15), said cartridge (71) housing means for pre-filtering and/or biocidal treating unpurified water, the cartridge (71) having a hollow inlet barb (73), a flexible tube (29) having a first end portion (29a) and a second end portion (29b), the first end portion (29a) of the tube (29) being mounted on the inlet barb (73) of the cartridge (71), and straining and weighing means mounted on the second end portion (29b) of the tube (29) for straining water pulled into the tube (29) and for weighting the second end portion (29b) of the tube (29).

20. The portable drinking water filtration apparatus of claim 19, the pump barrel (21a) being provided with means for securing the cartridge (71) in place.

21. The portable drinking water filtration apparatus of claim 19, further including a storage compartment (33) formed inside the housing (13) for storing the cartridge (71), the tube (29), and the straining and weighting means when the portable drinking water filtration apparatus is not in use.

22. A portable drinking water filtration apparatus (11) for filtering and purifying water comprising a housing (13) having a cylinder-like top wall (13a) and a bottom cap (13b) attached to a lower end portion of the wall (13a) forming a container, a pump block (15) formed in the housing (13), the pump block (15) having a water inlet port (17), a water outlet port (19), and a passageway (20) extending through the pump block (15) between the inlet port (17) and the outlet port (19), a pump (21) in the pump block (15) for pumping water from the inlet port (17) to and through the outer port (19), the pump (21) having a pump barrel (21a) and a piston (21b) mounted in the pump barrel (21a) for back and forth movement inside the pump barrel (21a), a piston handle (21c) mounted on top of the piston (21b) so that the piston handle (21c) may be grasped and moved up and down to pump the piston (21b) up and down, first valve means positioned in the pump block (15) at the first inlet port 17 for blocking flow of water from the passageway (20) out through the water inlet port (17), a filtration chamber (25) positioned inside the housing (13) beneath the water outlet port (19) of the pump block (15), the filtration chamber (25) having chamber walls (25a), the filtration chamber (25) having a water inlet opening (25b) being positioned for receiving water from the water outlet port (19) of the pump block (15), second valve means positioned at the outlet port (19) of the pump block (15) for blocking flow of water from the filtration chamber (25) back into the pump block (15), the filtration chamber (25) having a first water outlet opening (25c) that recesses water to an outlet port (13c) in the bottom cap (13b) of the housing (13), filtration means positioned in the filtration chamber for filtering and/or purifying water, sealing means for sealing between the filtration means and the filtration chamber walls (25a) at the water inlet opening (25b) of the filtration chamber (25) and for preventing water from the pump (21) from entering the first water outlet opening (25c) of the filtration chamber (25) without flowing through the filtration means, first bottle connection means formed on the bottom cap (13b) of the housing (13) for connecting the bottom cap (13b) of the housing (13) to a bottle to permit water to flow from the first water outlet opening (25c) of the filtration chamber (25) through the outlet port (13c) in the bottom cap (13b) of the housing (13) into the bottle, and air venting/second water outlet opening means in contact with the first water outlet opening (25c) of the filtration chamber (25) for venting air from a bottle as water is pumped from the drinking water filtration apparatus (11) through the water outlet port (13c) of the bottom cap (13b) into the bottle and for channelling water to an alterative outlet port (13d) formed in the wall (13a) of housing (13) when the outlet port (13c) in the bottom cap (13b) is plugged, wherein water may be pulled into the pump block (15) through the water inlet port (17) of the pump block (15), pumped through the pump block, through the filtration means, out the first water outlet opening of the filtration chamber, and through the outlet port (13c) of the bottom cap (13b) of the housing (13) into a bottle mounted on the first bottle connection means, or, if the water outlet port (13c) of the bottom cap (13b) is plugged, pumped from the first water outlet opening (25c) to a second water outlet opening (25d) and through the alternative outlet port (13d), the water inlet port (17) of the pump block (15) comprising a hollow inlet barb (27), the portable drinking water filtration apparatus (11) further including a flexible tube (29) having a first end portion (29a) and a second end portion (29b), the first end portion (29a) of the tube (29) being mounted on the inlet barb (27), straining and weighting means mounted on the second end portion (29b) of the tube (29) for straining water pulled into the tube (29) and for weighting the second end portion (29b) of the tube (29), and a storage compartment (33) formed inside the housing (13) for storing the tube (29) and the straining and weighting means when the portable drinking water filtration apparatus (11) is not in use, the handle (21c) being sized to engage the upper end portion of the wall (13a) of the housing (13) to enclose the interior of the housing (13) when the piston (21b) is in a down position, the pump barrel (21a) being closed at its upper end portion by a two-piece snap disk (21d) which captures the piston (21b) in the pump barrel (25a), the first valve means being a check valve (39) including a ball (39a) positioned inside the passageway (20) of the pump block (15) and adapted to close the water inlet port (17) of the pump block (15) when the ball (39a) covers the water inlet port (17) of the pump block (15), the ball (39a) having a specific gravity of less than the specific gravity of water, and the ball (39a) being positioned in the passageway (20) of the pump block (15) at the water inlet port (17) of the pump block (15) by a pedestal plug (39b) that forms a part of the pump block (15), the second valve means comprising a perforated disk (41) extending across the passageway (20) of the pump block (15) at the water outlet port (19) of the pump block (15), and a flexible rubber disk (43) mounted on the perforated disk (41) and covering the perforations therein, the rubber disk (43) being bias towards the perforated disk (41) to cover the perforations therein but being flexible enough to deflect away from the perforated disk (41) when water is pumped from the pump block (15) through the perforated disk (41) into the filtration chamber (25), the filtration means including a filtration canister (45) having a canister housing (45a), and a filtration material (45b) for filtering and/or purifying water positioned inside the canister housing (45a), the filtration canister housing (45a) having a bottom wall (45c) having a water outlet grid opening (45d) and a frustoconical side wall (45e) extending upwardly from the bottom wall (45c), a plurality of gussets (45f) formed on the outside surface of the frustoconical side wall (45e), a canister cap (45g) circumferentially connected to the top portion of the frustoconical side wall (45e), the canister cap (45g) having a water inlet grid opening (45h) that is surrounded by an upwardly extending cylindrical collar (45i), the collar (45i) having a sealing member (47) surrounding it for sealing between the collar (45i) and the chamber walls (25a) of filtration chamber (25) at the water inlet opening (25b) of the filtration chamber (25), the bottom cap (13b) of the housing (13) having a frustoconical recess (13e) formed in its inside surface to receive the filtration canister (45), the bottom cap (13b) having a ledge portion (13f) surrounding the circumference of the recess (13e) formed in its inside surface for engagement with the gussets (45f) of the canister housing (45a) to position the sealing member (47) surrounding the collar (45i) against the chamber walls (25a) of the filtration chamber (25) at the water inlet opening (25b) of the filtration chamber (25) to seal between the collar (45i) of the canister cap (45g) and the chamber walls (25a) of the filtration chamber (25) at the water inlet opening (25b) of the filtration chamber (25) and to space the bottom wall (45c) of the canister housing (45a) away from the inside surface of the bottom cap (13b), and a plurality of riser grooves (13g) formed in the inside surface of the bottom cap (13b) extending from the bottom of the recess (13e) in the bottom cap (13b) to the ledge portion (13f) for providing a path to the alterative outlet port (13d) formed in the wall (13a) of housing (13), the canister housing (45a) and canister cap (45g) being made of plastic, the filtration means having a 0.1 to 10 micron retention, the first bottle connection means comprising an annular ring (49) extending from the outside surface of the bottom cap (13b) of the housing (13), further including second bottle connector means formed on the bottom cap (13b) of the housing (13) for connecting the bottom cap (13b) of the housing (13) to a bottle having a larger mouth than the mouth of the bottle adapted to be connected to the first bottle connector means, the second bottle connection means comprising a second annular ring (51) extending from the outside surface of the bottom cap (13b) of the housing (13), the second ring (51) being spaced apart from and being concentric with the first ring (49), the second ring (51) having annular shoulder (51a) formed on its inner surface for receiving the rim of a mouth of a biker bottle, further including third bottle connection means formed on the bottom cap (13b) of the housing (13) for connecting the bottom cap (13b) of the housing to a bottle having a larger mouth than the mouth of the bottle adapted to be connected to the second bottle connection means, the third bottle connection means comprising a ring (53) spin welded to the side portion of the bottom cap (13b) of the housing (13), the ring (53) having a knurled outer surface (53c) to aid gripping of the apparatus (11), the ring (53) having a threaded inner surface (53a) for receiving a threaded mouth of an all-trail bottle, the air venting/second water outlet opening means including a channel (55) extending from the filtration chamber (25) to the alternative water outlet port (13d), the channel (55) having an end portion having a spout (37) mounted therein, and further including plug means for plugging the outlet port (13c) of the bottom cap (13b) of the housing (13), and further including plug and cover means for plugging the outlet port (13c) of the bottom cap (13b) of the housing (13) and for covering the first, second and third bottle connection means when the outlet port (13c) of the bottom cap (13b) of the housing (13) is plugged to keep the outside surface of the bottom cap (13b) clean.

23. A portable drinking water filtration apparatus for filtering and purifying water, comprising a housing, a chamber formed inside the housing having an inlet opening and an outlet opening, filtration media positioned inside the chamber between the chamber inlet opening and the chamber outlet opening, means for forcing water through the filtration media, and a plurality of bottle connection means formed on the housing adjacent to the chamber outlet opening for connecting the housing to a variety of different sized bottles, wherein water may be introduced to the chamber through the chamber inlet opening in the housing and forced through the filtration media inside the housing before exiting the chamber outlet opening in the housing into a bottle mounted on one of the bottle connection means, the means for forcing the water through the filtration media being a pump.

24. A portable drinking water filtration apparatus for filtering and purifying water, comprising a housing, a chamber formed inside the housing having an inlet opening and an outlet opening, filtration media positioned inside the chamber between the chamber inlet opening and the chamber outlet opening, means for forcing water through the filtration media, and a plurality of bottle connection means formed on the housing adjacent to the chamber outlet opening for connecting the housing to a variety of different sized bottles, wherein water may be introduced to the chamber through the chamber inlet opening in the housing and forced through the filtration media inside the housing before exiting the chamber outlet opening in the housing into a bottle mounted on one of the bottle connection means, the plurality of bottle connection means including first bottle connection means for connecting the housing to a bottle and second bottle connection means for connecting a housing to a bottle, the first bottle connection means including a circular ring extending from the housing and surrounding the outlet opening of the chamber, the second bottle connection means including a second circular ring extending from the housing, the second ring being spaced apart from and being concentric with the first ring, the second ring having an annular groove formed in its outer surface and having an annular shoulder extending from the groove toward the center axis of the ring for receiving the rim of a mouth of a biker bottle.

25. The portable drinking water filtration apparatus of claim 24, further including third bottle connection means for connecting the housing to a bottle, the third bottle connection means including a third circular ring extending from the housing, the third ring being spaced apart from and being concentric with the first ring and the second ring, the third ring having a threaded inner surface for receiving a threaded mouth of a wide mouth trail bottle.

26. A portable drinking water filtration apparatus for filtering and purifying water, comprising a housing, a chamber formed inside the housing having an inlet opening, a first outlet opening, and a second outlet opening, filtration media positioned inside the chamber between the chamber inlet opening and the chamber outlet openings, and means for forcing water through the filtration media, the second chamber outlet opening being in contact with the first chamber outlet opening for venting air as water is forced through the filtration media and discharged from the first chamber outlet opening and for discharging water from the chamber when the first chamber outlet opening is plugged, further including a plurality of bottle connection means formed on the housing adjacent to the first chamber outlet opening for connecting the housing to a variety of different sized bottles.

27. The portable drinking water filtration apparatus of claim 26, the plurality of bottle connection means including first bottle connection means for connecting the housing to a bottle and second bottle connection means for connecting the housing to a bottle, the first bottle connection means including a circular ring extending from the housing and surrounding the outlet opening of the chamber, and the second bottle connection means including a second circular ring extending from the housing, the second ring being spaced apart from and being concentric with the first ring, the second ring having an annular groove formed in its outer surface and having an annular shoulder extending from the groove toward the center axis of the ring for receiving the rim of a mouth of a biker bottle.

28. The portable drinking water filtration apparatus of claim 27, further including third bottle connection means for connecting the housing to a bottle, the third bottle connection means including a third circular ring extending from the housing, the third ring being spaced apart from and being concentric with the first ring and the second ring, the third ring having a threaded inner surface for receiving a threaded mouth of a wide mouth trail bottle.

* * * * *